Nov. 29, 1960     O. L. GUSSLER, JR     2,962,063
SAW GAUGE FOR CUTTING WINDOW MEMBERS
Filed Feb. 17, 1959     2 Sheets-Sheet 2
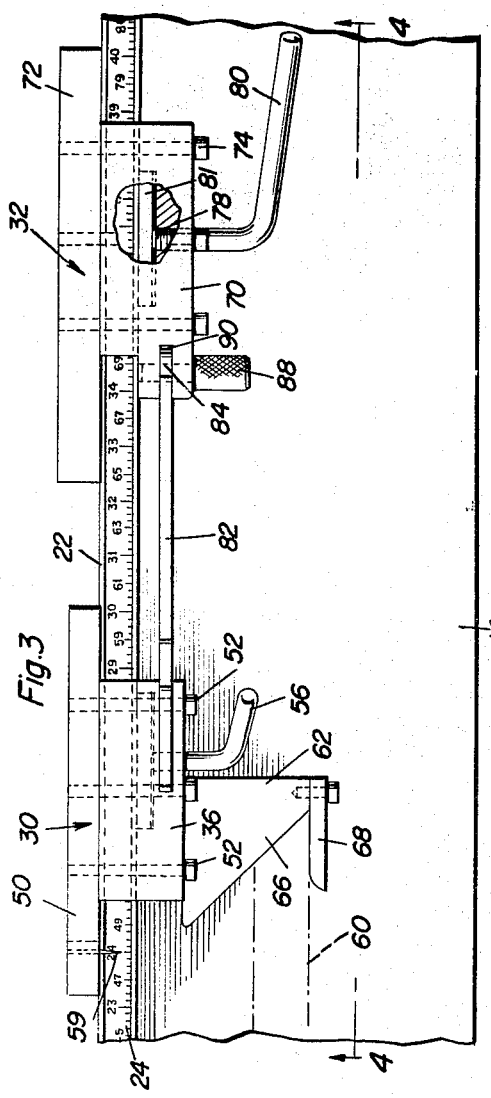
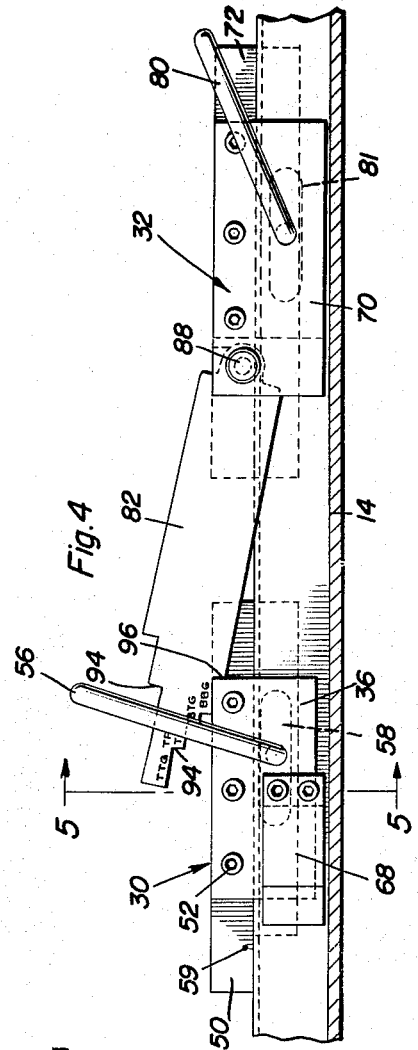
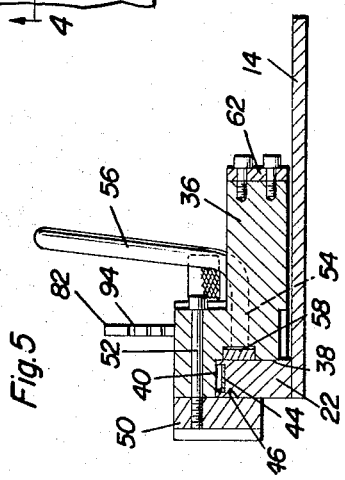
Ova L. Gussler, Jr.
INVENTOR.

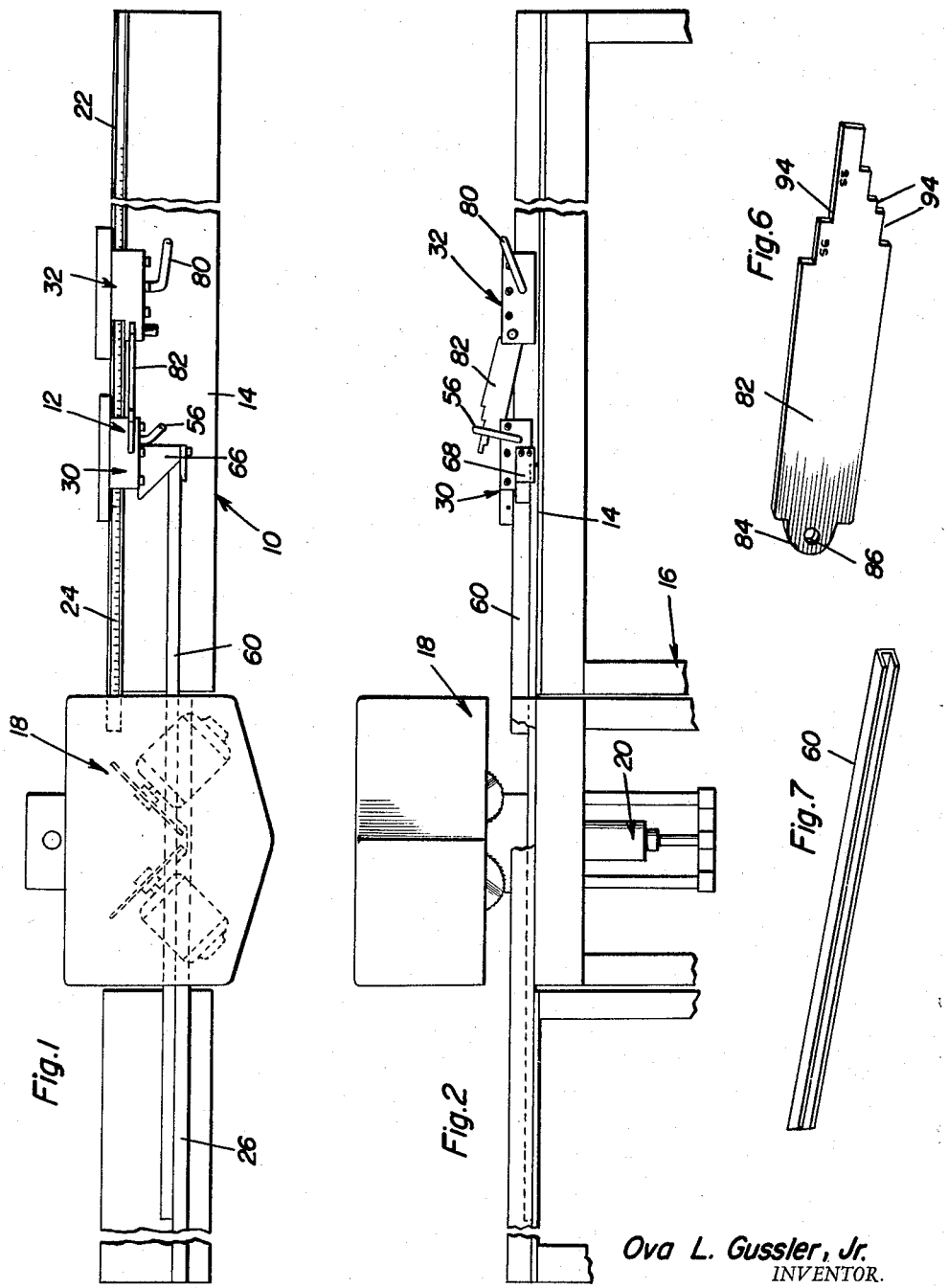

United States Patent Office 2,962,063
Patented Nov. 29, 1960

2,962,063
SAW GAUGE FOR CUTTING WINDOW MEMBERS

Ova L. Gussler, Jr., 4000 Gartin Ave., Ashland, Ky.

Filed Feb. 17, 1959, Ser. No. 793,908

5 Claims. (Cl. 143—174)

This invention relates to saw gauges and more particularly to a saw gauge especially useful in cutting window members but generally useful in cutting any members of repetitive length.

An object of the invention is to provide a saw gauge facilitating the cutting of various types of workpieces, for instance wood, metal or plastic, whereby workpieces of a selective length may be much more quickly cut. In the fabrication of windows, for example, numerous pieces of a predetermined length are required. Further, the ends of the pieces should be miter or square cut so that a neat, proper window results when the pieces are assembled. A saw gauge constructed in accordance with the invention is capable of being used with a conventional saw or with a special saw so that the workpiece may be merely placed on the saw bed and upon placing, the workpiece is automatically positioned so that it may be cut to an exact length and with the precise miter.

Another object of the invention is to provide a versatile saw gauge which is exceedingly simple in construction but yet has any number of positions for rapid cutting of a group of pieces to correct length with exact miters or square cuts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of a saw furnished with a gauge in accordance with the invention.

Figure 2 is a fragmentary side view of the saw and gauge of Figure 1.

Figure 3 is an enlarged fragmentary top view of the gauge, parts being broken away to illustrate otherwise hidden details of construction.

Figure 4 is an enlarged sectional view taken on the line 4—4 of Figure 3.

Figure 5 is a transverse sectional view taken on the line 5—5 of Figure 4.

Figure 6 (sheet 1) is a perspective view of the blade.

Figure 7 is a perspective view of a typical workpiece which has been cut by using the saw and gauge in Figure 1.

In the accompanying drawings there is shown a saw 10 equipped with a saw gauge 12 which typifies the invention. The saw 10 has a table 14 and a leg structure 16 supporting the table 14 in a horizontal position. A square cutting or double-miter saw 18 is mounted over table 14 and is adapted to be moved vertically by means of the saw carriage moving mechanism 20. The double-miter saw 18, mechanism 20 and table 14 are conventional, as is guide rail 22 along one edge of the table 14. Guide rail 22 has graduations 24 on its upper surface, and the guide rail is parallel to fence 26. Gauge 12 is made of a pair of essentially similar clamps 30 and 32 which are slidably mounted on the saw table 14 and which are locked in selected positions against rail 22. Clamp 30 is made of a carriage block 36 (Figure 5) having a surface 38 which abuts the inside vertical surface of guide rail 22, together with a horizontal surface 40 which is slidable over the top surface of guide rail 22. As seen in Figure 5 the guide rail preferably has a recessed upper surface within which to accommodate a scale 44 having graduations 24 thereon. By recessing the scale, the graduations are protected from wear, disfigurement, or other action which will eventually obscure the graduations. Surface 46 of block 36 abuts the outside surface of guide rail 22, cooperating with surfaces 38 and 40 to form a downwardly opening pocket within which the upper part of the guide rail 22 is nested. With this type of construction the block 36 is constrained in its movement. Surface 46 is actually a part of outer plate 50 connected by bolts 52 to the main body or block 36. It is evident that different types of construction may be resorted to with regard to the manufacture of this part of the clamp 30.

Clamp 30 has a screw 54 threaded in an internally threaded bore, and there is an operating handle 56 attached to the end of the screw 54. The inner extremity of the screw abuts a pad 58 which engages the inner surface of guide rail 22 so that when the screw 54 is tightened the clamp is held in a selected position. A pointer 59 overlying graduations 24 and connected to plate 50 indicates the length dimension of the workpiece 60 being cut by the saw 18.

A workpiece stop 62 is attached to block 36 and protrudes laterally therefrom toward the center line of the table 14. The workpiece stop is made of an essentially triangular plate 66 having a pivoted arm 68 at its outer apical assembly. The arm 68 functions with an adjacent edge of plate 56 to form a pocket within which to accommodate one end of workpiece 60 while it is being cut by saw 18.

Clamp 32 is quite similar to the described clamp 30. It is made of a main body or block 70 with a plate 72 at one edge thereof held in place by bolts 74. The plate 72 and portions of the main body or block 70 form a downwardly opening pocket within which guide rail 22 is nested. Clamp 30 is slidably adjusted on the guide rail in a direction parallel to the longitudinal center line of table 14 in the same manner as clamp 30. Screws 78 threaded in the body 70 of clamp 32 is adapted to be actuated by handle 80 to tighten pad 81, located in a cavity in body 70, against the inner surface of guide rail 22 and thereby hold clamp 32 in the selected adjusted position.

Guide blade 82 constitutes an important part of the invention since it enables the clamp 30 to be adjusted quickly between various positions for cutting workpieces of a set, for example all of the pieces necessary to construct a window, door, etc. Blade 82 is made of a flat plate with a reduced end 84 (Figure 6) having an aperture 86. A pivot 88 is passed through aperture 86 (Figure 3) and through a slot 90 that is formed in part of the body 70 on the side thereof adjacent to clamp 30. Pivot 88 loosely supports blade 82 so that it may be swung up or down for engagement of the various notches 94 with an edge 96 of the main body or block 36. Pivot 88 is quickly detached so that blade 82 may be removed and replaced by another blade for cutting a different type of door, window etc. An unlimited number of blades may be used. For square cuts stop 66 is substituted by a 90° stop. Code graduations, names or letters may be used with each of the notches 94 on the upper or lower edge or both edges of the blade 82. For example, in a construction of a window the information printed, scribed or otherwise applied to blade 82 may correspond with the pieces being cut, each of the pieces having a particular size relationship to each other. The two sides, the upper and lower parts, the rails, etc. must all be made of a correct length.

In use, clamp 32 is locked while using the correct blade for the cutting operation. Then the entire group of pieces for the window may be cut by merely moving the clamp 30 to the extent possible when adjusting blade 82 so that the notches 94 thereof engage edge 96 of clamp 30. The correct position of clamp 30 is established for each particular piece being cut by the blade 82. After this the workpiece 60 is cut directly as to length and miter by saw 18. If the piece is not to be miter cut, saw 18 is adjusted for a 90° cut. Of course, saw 18, being conventional, may be substituted by any type and size of conventional saw.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A saw assembly for cutting repetitive and selected predetermined lengths of workpieces comprising an elongated table, a guide rail on said table extending longitudinally thereof, a gauge assembly carried by said guide rail and including stop means engageable by workpiece to properly position the latter on said table longitudinally thereof, said gauge assembly including first and second clamp means each slidably engaged with said guide rail for independent movement therealong and each including individual releasable means for holding said clamp means in adjusted positions along said rail, one way stop means carred by one of said clamp means and engageable with the other clamp means for limiting movement of said first and second clamp means together to establish a predetermined minimum spatial relationship between said clamp means, said stop means carried by one of said clamp means, said one way stop means including a plurality of stop surfaces selectively engageable with said other clamp means.

2. The combination of claim 1 including graduations on said guide rail, a pointer on said second clamp means coacting with said graduations to indicate predetermined positions of said second clamp means along said guide rail.

3. The combination of claim 1 wherein said one way stop means includes an elongated gauge element, means pivotally securing one end of said gauge element to said first clamp means for movement about an axis extending transversely of said guide rail, said stop surfaces including a plurality of stepped notches formed in the undersurface of the free end of said gauge element engageable with said second clamp means each including a stop surface lying in a plane extending transversely of said guide rail.

4. The combination of claim 3 including a double miter saw on said table, said saw being mounted on said table a spaced distance from said stop means whereby a workpiece abutting said stop means will be positioned properly for severing by said saw.

5. A saw assembly for cutting repetitive and selected predetermined lengths of workpieces comprising an elongated table, a guide rail on said table extending longitudinally thereof, a gauge assembly carried by said guide rail and including stop means engageable by workpieces to properly position the latter on said table longitudinally thereof, said gauge assembly including first and second clamp means each slidably engaged with said guide rail for independent movement therealong and each including individual releasable means for holding said clamp means in adjusted positions along said rail, one way stop means carried by one of said clamp means and engageable with the other clamp means for limiting movement of said first and second clamp means together to establish a predetermined minimum spatial relationship between said clamp means, said stop means carried by one of said clamp means, said one way stop means including a plurality of stop surfaces selectively engageable with said other clamp means, said one way stop means including an elongated gauge element, means pivotally securing one end of said gauge element to said first clamp means for movement about an axis extending transversely of said guide rail, said stop surfaces including a plurality of stepped notches formed in the undersurface of the free end of said gauge element engageable with said second clamp means, each of said notches including a stop surface lying in a plane extending transversely of said guide rail, the lowermost of said notches being closest to said first clamp means.

References Cited in the file of this patent

UNITED STATES PATENTS

| 834,206 | Kantner | Oct. 23, 1906 |
| 1,020,422 | Hessler et al. | Mar. 19, 1912 |
| 1,194,936 | Bemis | Aug. 15, 1916 |
| 1,485,149 | Renken | Feb. 26, 1924 |
| 2,722,731 | Le Tarte | Nov. 8, 1955 |
| 2,838,078 | Cusanza | June 10, 1958 |
| 2,856,973 | Horton | Oct. 21, 1958 |